United States Patent
Harley et al.

(10) Patent No.: US 7,599,625 B1
(45) Date of Patent: Oct. 6, 2009

(54) METHOD OF INITIALIZING OPTICAL COMMUNICATION LINKS

(75) Inventors: James Harley, Nepean (CA); Kim B. Roberts, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 468 days.

(21) Appl. No.: 11/362,911

(22) Filed: Feb. 28, 2006

Related U.S. Application Data

(60) Provisional application No. 60/656,368, filed on Feb. 28, 2005.

(51) Int. Cl.
*H04B 10/00* (2006.01)
*H04B 10/12* (2006.01)

(52) U.S. Cl. ............... 398/158; 398/159; 398/147; 398/29

(58) Field of Classification Search ............ 398/158, 398/159, 147, 25, 27, 156, 33, 29, 31, 81, 398/140, 141
See application file for complete search history.

(56) References Cited

U.S. PATENT DOCUMENTS

| | | | |
|---|---|---|---|
| 7,058,311 B1* | 6/2006 | Islam et al. | 398/140 |
| 7,133,611 B2* | 11/2006 | Kaneko | 398/30 |
| 7,389,049 B2* | 6/2008 | Takahara et al. | 398/81 |

* cited by examiner

*Primary Examiner*—M. R. Sedighian
(74) *Attorney, Agent, or Firm*—Kent Daniels; Blake, Cassels & Graydon LLP

(57) ABSTRACT

A method of initializing an optical communication link between nodes. Optical transmitters adapted to pre-compensate link impairments based upon an optical compensation parameters are utilized to establish an optical communications link. Pre-compensation parameter values are selected at a node for generating an optical signal. The value is selected until confirmation from the remote node is received that the optical signal transmission has been successful. The successful pre-compensation parameter value is then used to generate the optical signal for the communications link.

12 Claims, 3 Drawing Sheets

METHOD OF INITIALIZING OPTICAL COMMUNICATION LINKS

CROSS-REFERENCE TO RELATED APPLICATIONS

This application claims benefit under 35 U.S.C. 119(e) from U.S. Provisional Patent Application Ser. No. 60/656,368, entitled Optical Signal Transmitter Systems With Electronic Pre-compensation, which was filed on Feb. 28, 2005.

TECHNICAL FIELD

The present invention relates to initializing optical communications link between nodes, and in particular to optical communications links where the transmitter is adapted to pre-compensate link impairments.

BACKGROUND OF THE INVENTION

Optical transmitters that can pre-compensate for impairments of an optical link are described in Applicant's co-pending U.S. patent application Ser. Nos. 10/262,944, filed Oct. 3, 2002; 10/307,466 filed Dec. 2, 2002; 10/405,236 filed Apr. 3, 2003; and 10/677,223, filed Oct. 3, 2003, the contents of all of which are hereby incorporated herein by reference, and International Patent Application No. PCT/CA03/01044 filed Jul. 11, 2003. Techniques for compensating both linear and non-linear impairments in an optical link by using an optical transmitter capable of pre-compensating for optical link impairments are disclosed.

An example of such an optical transmitter is shown in FIG. 1. In the transmitter 100, a signal processor 16 receives the input data signal x(t) as an input, and uses a compensation function to compute successive multi-bit In-phase and Quadrature values representing successive loci of the endpoint of a desired or target optical E-field vector. A linearizer 18 then uses the multi-bit loci to synthesize a pair of multi-bit digital drive signals. The digital drive signals are then converted into analog (RF) signals by respective high speed multi-bit Digital-to-Analog Converters (DACs) 20, which are then amplified 21 (and possibly band-pass filtered to remove out-of-band noise) to generate the drive signals supplied to an electrical/optical (E/O) converter 22. The E/O converter 22 will normally be provided as either nested Mach-Zehnder (MZ) interferometers, or as a conventional dual branch MZ interferometer. The E/O converter 22 modulates a carrier signal 6 having a desired wavelength is generated by the laser 2. The digital drive signals are computed such that the drive signals supplied to the E/O converter 22 will yield an optical E-field $E_O(t)$8 at the E/O converter output 24 that is a high-fidelity reproduction of the target E-field computed by the signal processor 16.

In general, the signal processor 16 is capable of implementing any desired mathematical function, which means that the compensation function can be selected to compensate any desired signal impairments of the optical path, including, but not limited to, dispersion, Self-Phase Modulation (SPM), Cross-Phase Modulation (XPM), four-wave mixing and polarization dependent effects (PDEs) such as polarization dependent loss. In addition, the compensation function can be dynamically adjusted for changes in the optical properties of the link and component drift due to aging.

In the commissioning or initialization of optical communication links between nodes of an optical system, the impairments of the optical communications link, such as dispersion, must be determined so that the transmitter of the link can be appropriately configured to overcome the impairments before regular communications can be established. Determining the appropriate values for optical pre-compensation parameters can be time consuming.

In addition, when the path of the communications link between the transmitter and the receiver is not the assumed path or is changed over time, for example via optical switches, the optical impairments of the path such as the dispersion profile will not match a particular design profile. As a result of changes in the path, the margin or reach of the optical transmission may be reduced or may preclude the operation of a communications link altogether. It is also often desirable to establish a new optical connection swiftly, in an interval of tens or hundreds of milliseconds. Until the optical parameters such as dispersion are approximately known, at-speed digital communication cannot be established. The process of re-initializing the optical communications link is a time consuming process.

When the optical parameters such as chromatic dispersion of a link is unknown, an approximate value must be determined in order to compensate the impairment before the link can be successfully started. One common solution is to directly measure the impairment of the optical link using specialized test equipment during commissioning of the optical communications link. Another solution is to scan slowly, and have operators at nodes on both ends of the communications link until signal is acquired. Both solutions are time consuming and require communications between the ends of the link. Neither of these solutions are capable of dealing with sudden changes in the optical link which may introduce new impairments.

Accordingly, a method of asynchronously and independently initializing an optical communication links between nodes of a optical communications system utilizing transmitters adapted to pre-compensate link impairments based on an optical compensation parameter remains highly desirable.

SUMMARY OF THE INVENTION

An object of the present invention is to provide methods and techniques for initializing an optical communications link utilizing an optical transmitter adapted to pre-compensate optical link impairments.

The method provides for optical nodes to establish communications in an independent and asynchronous manner when the optical impairments of the link is unknown. The transmitter of a node selects a candidate value for a chosen optical pre-compensation parameter and applies the pre-compensation parameter to the optical signal. The node selects a new pre-compensation parameter value until there is confirmation from the remote node that the optical signal has been received. The pre-compensation parameter value utilized, may be embedded in the optical signal or be represented by a uniquely generated signal or probe identifying the parameter used. The receivers at each node can decode the candidate pre-compensation parameter value when the impairments of the optical link are adequately compensated. The process occurs independently and asynchronously in each direction of the link if required. When both nodes of the optical link receive confirmation that the optical signal transmitted has been decoded in the opposite direction, the optical link is successfully established. The method can also operate in establishing a communications link in one direction where alternate communications medium is utilized for the return communication.

Thus, an aspect of the present invention provides a method of initializing an optical communications link between first and second nodes, the method comprising steps of: determining an operating pre-compensation parameter value; providing the operating parameter value to a transmitter at a first node adapted to pre-compensate link impairments based upon the optical pre-compensation parameter; and using the operating parameter value to generate a pre-compensated optical signal.

A further aspect of the present invention provides a method of initializing optical communication links between a first node and a second node including transmitters adapted to pre-compensate link impairments based upon an optical compensation parameters, the method at the first node comprising the steps of: selecting a first candidate value of the optical compensation parameter; transmitting a first optical signal generated using the first candidate compensation parameter, the optical signal including the first candidate parameter value; receiving a second optical signal from the second node; decoding a first operating parameter value, the first operating parameter value being indicative that the first optical signal has been successfully received by the second node; transmitting the first optical signal generated using the first operating parameter value.

Further features and advantages of the present invention, as well as the structure and operation of various embodiments of the present invention, are described in detail below with reference to the accompanying drawings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides methods for initializing optical communications links between nodes using transmitters adapted to pre-compensate link impairments based on an optical compensation parameter. Embodiments of the present invention are described below, by way of example only, with reference to FIGS. 2-3.

In general, the present invention provides a method of initializing optical communications between nodes of an optical network with each node operating in an independent and asynchronous manner. Transmitters in each node, adapted to pre-compensate optical link impairments based upon a value of an optical compensation parameter, select a pre-compensation parameter value for the optical link and encode an identifier in the optical signal that is generated. A new parameter value is selected until confirmation is received from the remote node that the optical signal has been successfully decoded.

Figure 1:
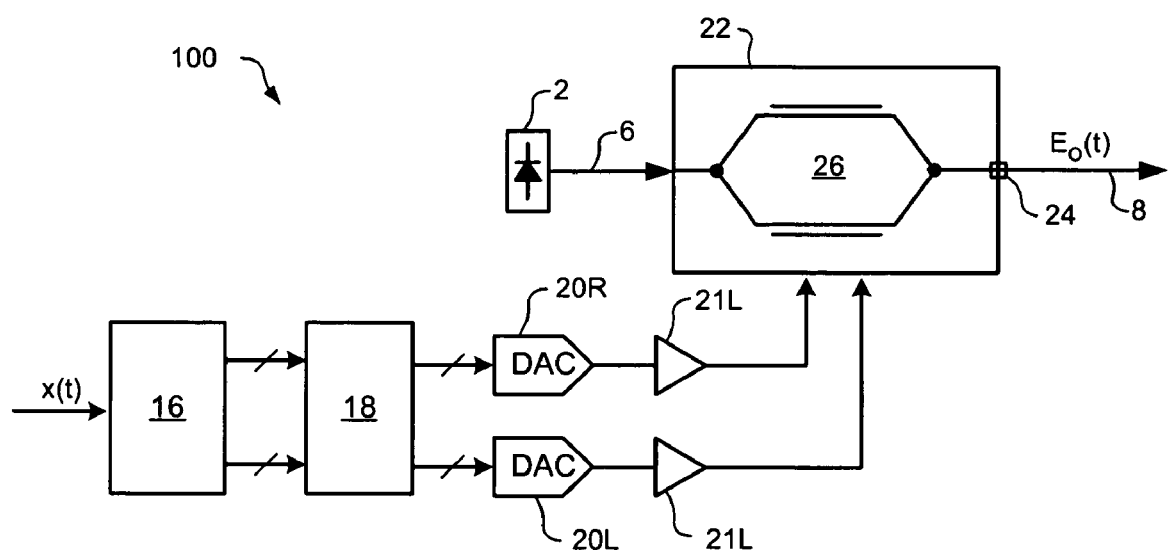
FIG. 1 schematically illustrates the principal components of a transmitter adapted to pre-compensate optical link impairments.
Figure 2:
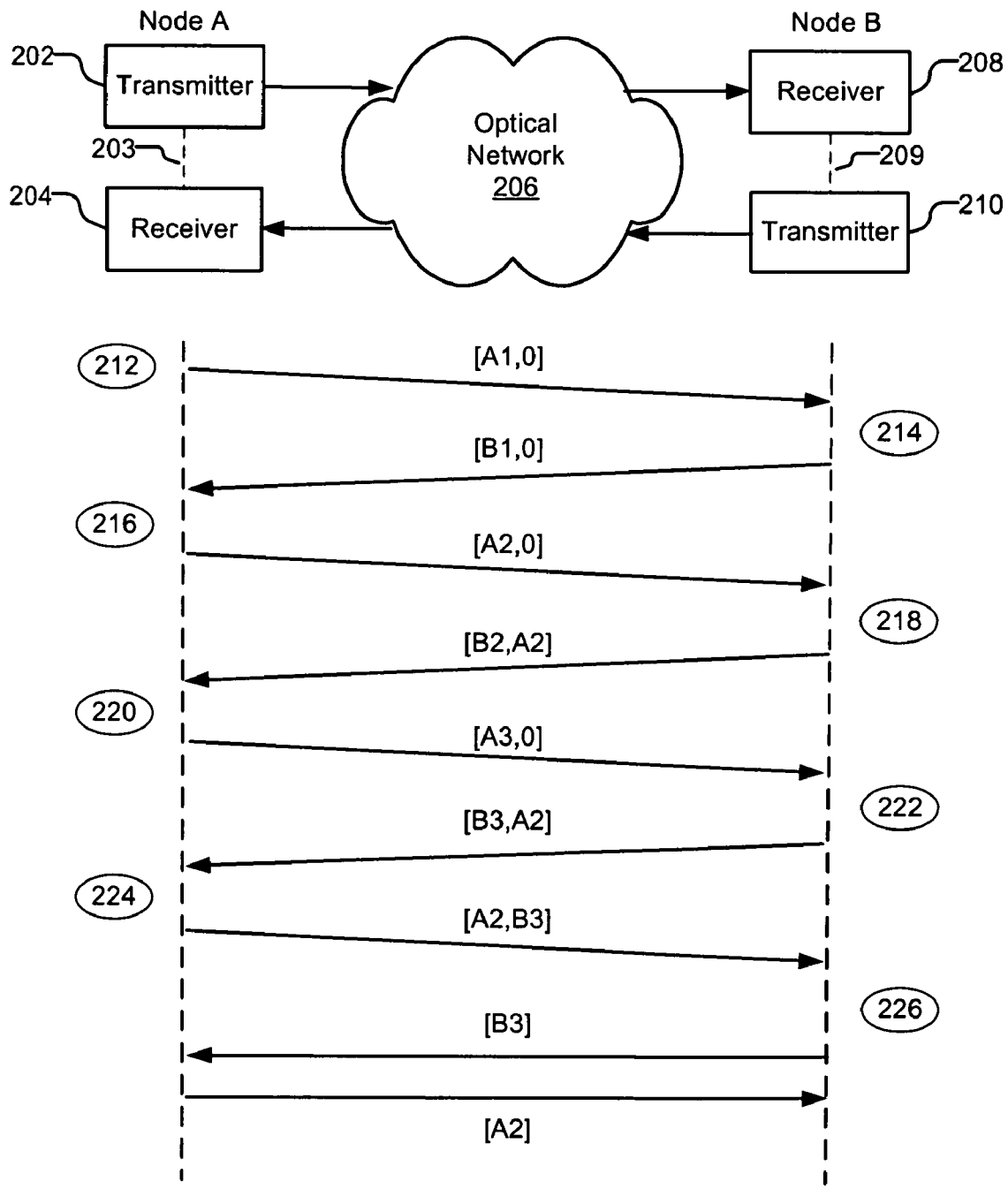
FIG. 2 schematically illustrates an optical link and a method of initializing communication on the optical communications link in accordance with an embodiment of the present invention.

FIG. 2 shows an optical system comprising two optical nodes, Node A and Node B. The nodes communicate via an optical network 206. The network may be a direct fiber path or a path transiting multiple fibers and optical network elements such as optical amplifiers, Optical Add Drop Multiplexers (OADM) and switches, etc to form the communications link. Each node comprises a transmitter and a receiver, Node A comprises transmitter 202 and receiver 204 and Node B comprises receiver 208 and transmitter 210. The transmitter and receiver in Node A and Node B are connected by data links 203 and 209 respectively. The data links 203 and 209 enable information to be passed between the transmitter and receiver.

The transmitters 202 and 210 are adapted to pre-compensate for link impairments of the optical path by utilizing a value for the pre-compensation parameter. The receivers, 204 and 208 comprise any known optical receiver such as a direct detection receiver. The receivers 204 and 210 are not required to provide any processing of the data received in the optical signal but may merely relay the data to an external processor or to the transmitter for processing.

In an exemplary embodiment of the method of initializing an optical communications link, a value for a candidate optical pre-compensation parameter for the optical signal is generated by the transmitter 202. The selection of the pre-compensation parameter may be performed by a processor incorporated within the transmitter or node, or may be performed externally. The pre-compensation parameter may be selected to compensate for individual or multiple non-linearities such as dispersion, Self-Phase Modulation (SPM), Cross-Phase Modulation (XPM), four-wave mixing and polarization dependent effects (PDEs).

The initial pre-compensation value, represented by A1 shown at step 212, may be selected by many methods. Operational constraints such as allotted initialization time, knowledge of the network path, and the specific pre-compensation parameters selected will affect how the initial value is determined. The initial parameter value may be a random start value, a value incrementally selected from a range of likely values based upon the path configuration, or by values provided by path design predictions. Alternatively, path identifiers such as disclosed in the Applicant's commonly owned U.S. Pat. No. 6,687,464 issued Feb. 3, 2004 may be utilized to determine the initial value A1.

At step 212 an optical signal is generated utilizing the optical pre-compensation value A1. The actual value, or a representation of the value utilized for the candidate pre-compensation parameter is encoded in the optical signal [A1, 0]. The value can be encoded by any means such as in the overhead information of the optical signal by a distinct signal or optical probe. The optical signal is then transmitted to the receiver 208 at Node B.

At step 214, if the selected candidate pre-compensation value A1 does not sufficiently compensate for the impairments of the optical link, the receiver 214 will not detect the optical signal and therefore cannot extract the candidate parameter value.

In this exemplary embodiment, the transmitter 210 at Node B is also commencing initialization of the link by selecting a candidate value for the pre-compensation parameter, identified as B1. It is assumed that the value of the pre-compensation parameter required in each direction is unique. In addition transmitter 210 may commence initialization independently of transmitter 202, however, for illustrative purposes to understand operation of the present invention they are shown as occurring sequentially. Transmitter 210 then generates an optical signal utilizing the selected candidate pre-compensation parameter value B1 at step 214 have the pre-compensation parameter value encoded [B1,0].

At step 216 the optical signal generated by transmitter 210 cannot be decoded by receiver 204 due to link impairments. Since transmitter 202 has not received confirmation that the first optical signal generated with compensation value A1 has been received by the receiver 208, the transmitter 202 then generates a new optical signal using a new candidate parameter value A2. The optical value A2 is then encoded in the transmitted optical signal [A2,0]. As with the initial candidate parameter value selection, the new candidate parameter value may be selected by various methods. The value may be selected incrementally or randomly across a range of values. Alternatively, interleaving step sizes across a range of values can be used in which a coarse step size is used to scan a large range and then on the second iteration an offset such as half of the coarse step size is used to rescan the range where the overall set is interleaved, such as in a binary search algorithm.

At step 218 the receiver 208 at Node B receives, and is able to successfully decode, the optical signal from transmitter 202 utilizing candidate pre-compensation parameter value A2. Therefore, the value of the selected candidate optical parameter is sufficient to overcome the path impairments of the optical communications link. The received candidate value parameter is decoded from the optical signal, and relayed from the receiver 208 to the optical transmitter 210 by the data link 209.

As the received optical signal did not provide confirmation that the previous optical signal sent at step 214 to receiver 204 using value B1 was received, a new optical signal is generated at transmitter 210 using a new pre-compensation parameter value B2. In addition, the value of the received pre-compensation value, now considered the operating pre-compensation parameter value, from transmitter 202, is also encoded in the optical signal, for illustrative purposes this is represented by [B2,A2]. The optical signal using pre-compensation value B2 is then transmitted to receiver 204 at Node A.

At step 220 the optical signal generated by transmitter 210 using pre-compensation value B2 cannot be decoded by receiver 204 due to link impairments. Since transmitter 202 has not received confirmation that the first optical signal generated with compensation value A2 has been received by the receiver 208, the transmitter 202 then generates a new optical signal using a new candidate parameter value A3. The optical value A3 is encoded in the transmitted optical signal [A3,0].

At step 222 the receiver 208 may not be able to decode the encoded signal A3. Since the receiver 208 cannot decode the optical signal, it is assumed that receiver 204 did not receive the optical signal transmitted by transmitter 210 utilizing pre-compensation parameter B2. A new pre-compensation value is selected B3, and the previously determined operating parameter value A2 is encoded in a new signal [B3,A2] and transmitted to receiver 204 utilizing an optical signal generated with pre-compensation parameter value B3.

At step 224 the receiver 204 successfully receives and decodes the optical signal B3 and also received confirmation that operating parameter value A2 should be utilized in pre-compensating the optical signal sent to receiver 208 at Node B. The received candidate parameter value B3, is now the operating value for transmitter 210. The two operating parameter values [A2,B3] are then encoded in the optical signal and sent utilizing operating parameter value A2 to receiver 208 at Node B.

At step 226 Node B receives the encoded identifier [A2, B3] which confirms that Node A successfully received the optical signal. The communications link is then operational with Node B using operating pre-compensation parameter value B3 and Node A using operating pre-compensation parameter value A2.

As previously discussed, the candidate value of the pre-compensation parameter may be selected using various methods. Similarly, the generation of the operating parameter value may be equal to the candidate parameter value or may be generated by a method such as by interpolating a number of successful candidate parameter values.

Figure 3:
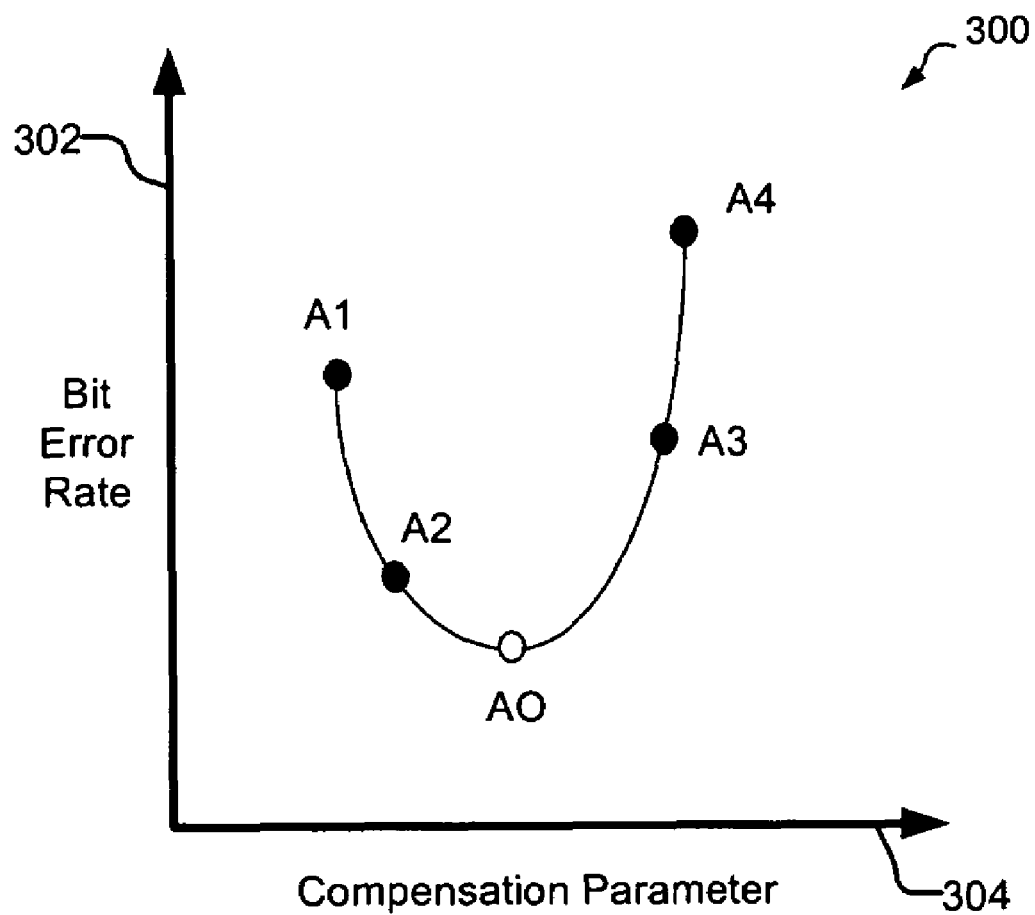
FIG. 3 graphically illustrates selection of a value of an operating pre-compensation parameter in accordance with an embodiment of the present invention.

FIG. 3 shows a graphical representation of how an optimal operating parameter value may be extrapolated based upon received candidate values. Rather than utilizing the candidate parameter value received at the node, the receiving node may extrapolate an optimal operating parameter value based bit error rate (BER) of a number of successful data points. The y-axis 302 of the chart 300 shows received signal bit error rate while the x-axis 304 defines a range of values for the selected pre-compensation parameters. In this example, a receiver may successfully decode a number of candidate values which results in varying bit error rates of the received signal. For example, four successful candidate parameter values are received, such as compensation parameter values A1, A2, A3 and A4 at receiver 208 of Node B each having an associated BER. A confirmation is not sent back to Node A, such as for example at step 218, until an optimal value A0 is computed which provides the lowest bit error rate can be interpolated. The number of data points may be a predetermined number of candidate values or time dependent. The receiving Node B then encodes and transmits the optimal operating parameter value A0 back to the transmitting Node A. Other statistical methods such as regression analysis may also be utilized to determine the optimal operating parameter value when the BER is at a minimum.

The embodiments of the invention described above are intended to be illustrative only. The scope of the invention is therefore intended to be limited solely by the scope of the appended claims.

We claim:

1. A method of initializing an optical communications link between first and second nodes, the method comprising steps of:
    selecting a candidate value of a predetermined compensation parameter by any one of:
        incremental selection across a predetermined range of candidate values;
        random selection from a predetermined set of candidate values; and
        an interleaving binary search algorithm of predetermined candidate values;
    supplying the selected candidate value to a transmitter of the first node, the transmitter using the candidate value to generate a pre-compensated optical signal;
    transmitting the pre-compensated optical signal to the second node;
    receiving an operating value at the first node, the operating value being indicative that the second node has successfully received the pre-compensated optical signal; and
    supplying the received operating value to the transmitter of the first node, the transmitter subsequently using the operating value to generate the pre-compensated optical signal.

2. The method of claim 1 wherein the pre-compensation parameter is related to any one or more of dispersion, Self-Phase Modulation (SPM), Cross-Phase Modulation (XPM), four-wave mixing and polarization dependent effects (PDEs).

3. The method of claim 1 wherein the candidate value is encoded in overhead data of the pre-compensated optical signal.

4. The method of claim 1 wherein the candidate value is represented by a unique optical probe signal transmitted to the second node.

5. The method of claim 4 wherein the step of determining the operating value comprises steps of:
receiving the optical probe signal from the first node;
measuring a value of an optical parameter of the received optical probe signal; and
determining the operating value from the measured value.

6. The method of claim 5, further comprising steps of:
receiving a sequence of distinct optical probe signals;
identifying an acceptable optical probe signal; and
communicating the occurrence of the identification.

7. The method of claim 1 wherein the operating value is received at the first node via a low bandwidth optical channel on the optical communications link or by a communications medium external to the optical communications link.

8. The method of claim 1 further comprising steps of:
receiving the pre-compensated optical signal at the second node;
decoding the candidate value from the received optical signal;
determining the operating value based on the decoded candidate value; and
transmitting the operating value to the first node.

9. The method of claim 8 wherein the step of determining the operating value comprises any one of:
using the candidate value decoded from the received optical signal as the operating value;
computing the operating value by interpolation using a set of successively decoded candidate values relative to bit error rate; and
computing the operating value by a regression analysis of a set of successively decoded candidate values.

10. The method of claim 1, wherein the steps of selecting a candidate value, supplying the selected candidate value to the transmitter of the first node and transmitting the pre-compensated optical signal to the second node are repeated until an operating value of the compensation parameter is received from the second node, the operating parameter being indicative that the second node has successfully decoded a current candidate value from the pre-compensated optical signal.

11. A system for initializing an optical communications link between first and second nodes, the system comprising:
a processor of the first node operative to:
select a candidate value of a predetermined compensation parameter, and supply the selected candidate value to a transmitter of the first node, the transmitter generating a pre-compensated optical signal based on the candidate value and transmitting the pre-compensated optical signal to the second node via the optical communications link; and
receive an operating value of the compensation parameter, the operating value being indicative that the second node has successfully received the pre-compensated optical signal; and
supply the received operating value to the transmitter, the transmitter subsequently using the operating value to generate the pre-compensated optical signal;
wherein the candidate value is selected by any one of:
incremental selection across a predetermined range of candidate values;
random selection from a predetermined set of candidate values; and
an interleaving binary search algorithm of predetermined candidate values.

12. The system of claim 11, further comprising a processor of the second node decoding the candidate value from the received optical signal, determining the operating value based on the decoded candidate value, and transmitting the operating value to the first node.

* * * * *